Aug. 28, 1951    J. H. MERCIER ET AL    2,565,617
SHOCK ABSORBER
Filed April 5, 1946    5 Sheets-Sheet 1

FIG. 1.

INVENTORS
JEAN MERCIER,
JACQUES MERCIER,
BY
Autumn Middleton
ATTORNEY

FIG. 2.

Aug. 28, 1951      J. H. MERCIER ET AL      2,565,617
SHOCK ABSORBER
Filed April 5, 1946      5 Sheets-Sheet 4

INVENTORS
JEAN MERCIER,
JACQUES MERCIER,
BY
ATTORNEY

Aug. 28, 1951  J. H. MERCIER ET AL  2,565,617

SHOCK ABSORBER

Filed April 5, 1946  5 Sheets-Sheet 5

INVENTORS
JEAN MERCIER,
JACQUES MERCIER,
BY
Arthur Middleton
ATTORNEY

Patented Aug. 28, 1951

2,565,617

UNITED STATES PATENT OFFICE 2,565,617

SHOCK ABSORBER

Jacques H. Mercier and Jean Mercier,
New York, N. Y.

Application April 5, 1946, Serial No. 659,924

11 Claims. (Cl. 267—8)

This invention relates to astatic shock absorbers and more specifically to the hydraulic or cylinder-and-piston type in which flow passages for the hydraulic liquid are provided with spring loaded check valves for controlling the operation and shock-absorbing characteristics of the shock absorber.

It is one object to provide shock-absorbing characteristics whereby the shock-initiated stroke of the piston from the intermediate or neutral position to the extreme outer positions of the piston are relatively unsnubbed whereas the return strokes towards the neutral position are snubbed.

Another object is to provide snubbing characteristics on the respective return strokes, which are represented by curves in the stroke pressure coordinate system having a shape symmetrically identical to the one of the oscillatory return movement of the device to be dampened. It may be advantageous to have a flattened or substantially horizontal end portion at the extreme ends of the movement in order to facilitate and accelerate the return toward the median or neutral position in case of large oscillations.

The desired kind of dampening function to be obtained from the shock absorber can be mathematically expressed as follows:

If the force producing the return to neutral of the oscillatory movement be $F=y=f(x)$ then the shock absorber characteristics or dampened force during such return movement to neutral should be $F'=f(z)=-F=-y=-f(x)$.

Another object is to produce a shock absorber in which these characteristics can be readily predetermined as well as varied to suit specific requirements. Hence, it is a more specific object to provide for such variability by means of a single exchangeable element or spring.

Other objects are to provide a shock absorber having the aforementioned characteristics, which is structurally compact and simple, which can be readily assembled, and which is inexpensive to manufacture.

These objects are attained by providing the piston with a fluid transfer passage having a variable reaction spring loaded check valve herein termed the piston valve; by providing at one end of the working cylinder, a fluid outlet passage leading to the reservoir and having a constant reaction spring loaded check valve, the flow direction through both passages being co-directional; by providing lost motion pressure-transmitting means whereby the valve-closing spring pressure throttling the fluid transfer through the piston also reacts upon and counteracts and eventually neutralizes the valve-closing constant reaction spring pressure that normally checks the outflow into the reservoir; by providing a spring check inflow passage at one end of the working cylinder whereby to allow for inflow of fluid from the reservoir into the cylinder; and by providing a constant reaction spring for opening the piston valve against the pressure of the variable reaction spring as the valve-closing pressure thereof diminishes due to expansion thereof.

Functionally expressed, these objects are attained:

(a) Where the impulse is in the one direction (as for shock-initiated retraction of the piston, for instance) by allowing for substantially unsnubbed fluid transfer to take place through the piston as the piston shock-initiated travels towards the check valved but now closed end of the cylinder, while snubbing the subsequent return stroke as the transfer passage in the piston closes causing fluid pressure to overcome the spring loading normally present and throttling the end outlet passage;

(b) Where the impulse is in the opposite direction (when the piston rod extends from the neutral position, for instance) by allowing for unsnubbed fluid outflow from the cylinder end passage as the valve closing spring reaction from the piston becomes increasingly effective to counteract and relieve the closed spring load normally throttling the outlet passage, while snubbing the subsequent return stroke due to the spring preloading now effective to throttle the transfer passage in the piston, and due to the now effective closure of the inlet check at the opposite end of the cylinder.

According to one feature the piston is actuated by a piston rod and the volume differential or excess fluid volume due to piston rod displacement is compensated for by allowing it to escape through the spring loaded outflow check valve.

According to another feature a variable-reaction spring is effective upon the check valve that throttles the flow through the fluid transfer passage in the piston, while the spring that loads the outflow check valve at the cylinder end is of the constant-reaction type. A variable-reaction spring is one which requires the force needed for its compression to increase with the degree of compression, whereas in a constant-reaction spring the compressive force is uniform and substantially independent of the degree of compression.

Accordingly a feature resides in providing a variable reaction spring to surround the piston rod, which spring when under compression loads an annular check valve member closing the fluid transfer passages in the piston, although the dimensions or fully extended length of the spring is such that the loading is effective substantially only during the shock-initiated extension and the subsequent reaction stroke of the piston rod.

According to another feature a weak constant-reaction spring tends to open the piston valve member, although counteracting the variable-reaction pressure during that period during which it is effective upon the annular check valve member associated with the piston.

According to another feature the inflow check valve comprises an annular valve member lodging in a widened end portion of the working cylinder, which annular valve member is under the pressure of a coil spring having substantially the diameter of the annular valve member, so that the piston when in its retracted end position may lodge in the space within said annular valve member as well as within said spring.

Specific structural features lie in the manner in which the working cylinder is connected with a surrounding jacket so as to form a fluid reservoir in the space between the cylinder and the jacket.

Other features lie in the specific structure and configuration of the respective loading springs for the valves as well as in their functional relationship whereby they react upon one another during a part of the operating cycle of the shock absorber. More specifically a feature lies in providing a flat helically coiled variable-reaction spring for the piston check valve surrounding the piston rod, and providing a constant-reaction spring for the end outlet check valve composed of a series of superposed "Belleville" or dished spring washers.

It is among the advantages resulting from this invention that the shock-absorbing characteristics can be varied merely by a variation of the characteristics of the variable-reaction spring, or springs, that is to say by the exchange of a single spring element within the combination that represents the shock absorber according to this invention.

According to another embodiment both the outlet, as well as the inlet check valve are disposed at the same end of the working cylinder of the shock absorber, that is to say facing the same side of the piston. The piston is accordingly provided with an additional check valved fluid transfer passage for fluid transfer therethrough in a direction opposite to the direction of flow through the variable spring pressure controlled piston valve having a variable pressure loading spring interacting with and counteracting a closing spring provided for the outlet check valve.

Additional features therefore lie in the structural relationship of parts. One specific feature lies in the concentric arrangement of the inlet and outlet check valves. Another specific feature lies in the structural relationship of the variable pressure closing spring for the piston valve and a Belleville washer substantially constant pressure spring for the outlet check valve of the working cylinder.

The invention possesses other objects and features of advantage, some of which with the foregoing will be set forth in the following description. In the accompanying drawings there has been illustrated the best embodiment of the invention known to us, but such embodiment is to be regarded as typical only of many possible embodiments, and the invention is not to be limited thereto.

The novel features considered characteristic of our invention are set forth with particularity in the appended claims. The invention itself, however, both as to its organization and its method of operation, together with additional objects and advantages thereof, will best be understood from the following description of a specific embodiment when read in connection with the accompanying drawings in which

The shock absorber comprises an internal or working cylinder 10 surrounded by an external cylinder or casing 11 forming with the working cylinder an annular space or reservoir R.

The working cylinder or container 10 has a flange portion 13 at its lower end provided with flow passages 14 connected with or sunk into a bottom end portion 15. The bottom portion 15 has an upper internal shoulder 16 to receive the flange portion 13, and a lower internal shoulder 17. A check valve member in the form of an annulus 18 has vertical movement between the upper and the lower shoulder, being urged to close the flow passages 14 by a coil spring 19 lodging in a depression 20 formed in the bottom portion 15 by the shoulder 17. The outer contour of the bottom end portion has a cylindrical section 21 and a conical section 22.

The working cylinder 10 has a top end portion 23 with respect to which it fits over a shoulder 24, which also defines an overhanging marginal portion having flow passages or ports 25 and an external conical face 25ª whereby it is seated and confined within the external shell or casing 11 further to be defined and with which it forms an annular reservoir R for the hydraulic fluid.

The top end portion 23 has flow passages 27, bores 28 in which operate loosely slidable pressure transmitting pins 29, and a central opening 30 in which slides a piston rod 31 having a reduced lower end portion 32 constituting a shoulder 33 and a further reduced extreme end portion 34 constituting a shoulder 35. A working piston or movable partition 36 is fastened upon the reduced portion 34 and fixedly confined between the shoulder 35 and a rivet head 37 formed by the extreme end of the reduced portion 34.

The piston comprises a horizontal body portion 38 and a cylindrical portion 39 formed by a downwardly extending skirt portion 40 and an upwardly extending skirt portion 41, the upward skirt portion thus forming a cup-like depression 42, and the downward skirt portion forming an inverted cup-like depression 43. The body portion of the piston has flow passages 44 provided with an annular check valve member 45 having slide fit upon the reduced portion 32 of the piston rod. The annular member 45 has a circular downwardly extending ledge 45a over which fits loosely an annular gasket member or fiber annulus 46 adapted to be seated upon and to close the flow passages 44 against the pressure of a coil spring 46a disposed between the check valve member 45 and the body portion 38 of the piston.

Loosely slidable upon the piston rod within the working cylinder is an annular pressure transfer member or thrust plate 47 having openings 48 and a marginal downwardly extending skirt portion 49 within which lodges the upper and wider end of a spirally coiled compression spring 50 of flat spring material, the lower and narrower end of which spring rests upon the annular check valve member 45.

Above the top end portion 23 of the working cylinder is provided an annular check valve member 51 engageable by the pressure-transmitting pins 29, but normally urged down to close the flow passages 27 by a spring shown to be in the form of resiliently compressible Belleville washers 52 confined between the annular member 51 and an end closure member 53 of the outer casing or shell 11 through which passes the piston rod by way of an annular seal 54 held in place by a conical annulus 55 under the pressure of a coil spring 56 shown to be resting upon the Belleville washers 52. The check valve member 51 has an annular gasket 51a similar to the gasket member or annular fiber washer 46 shown to be provided for the check valve member 45.

The Belleville washers 52 are disposed within a space 57 which may be termed a fluid transfer chamber since through it passes pressure fluid from the upper end of the working cylinder into the reservoir.

The upper outer end closure member 53 has at the top a conical face 58, below which it has an annular shallow groove 59.

The outer shell or casing 11 comprises a wider lower portion 60 and a reduced upper portion 61. The wider portion 60 in turn comprises a cylindrical body portion 62 having at its lower end an inverted conical section 63 swedged over the bottom portion 15 so as to engage upon and lock with the conical section 22 thereof, and at its upper end a conical section 64 engaging upon and locking with the conical face 25a of the top end portion 23 of the working cylinder. It will be seen that the bottom and top end portions of the working cylinder 10 are thus confined against one another by the opposed conical sections 63 and 64 of the outer shell 11. The upper end of the reduced portion of the shell is swedged over and into tight connection with the conical face 58 of the upper end closure member 53 as well as into the annular groove 59 thereof.

Figure 1:
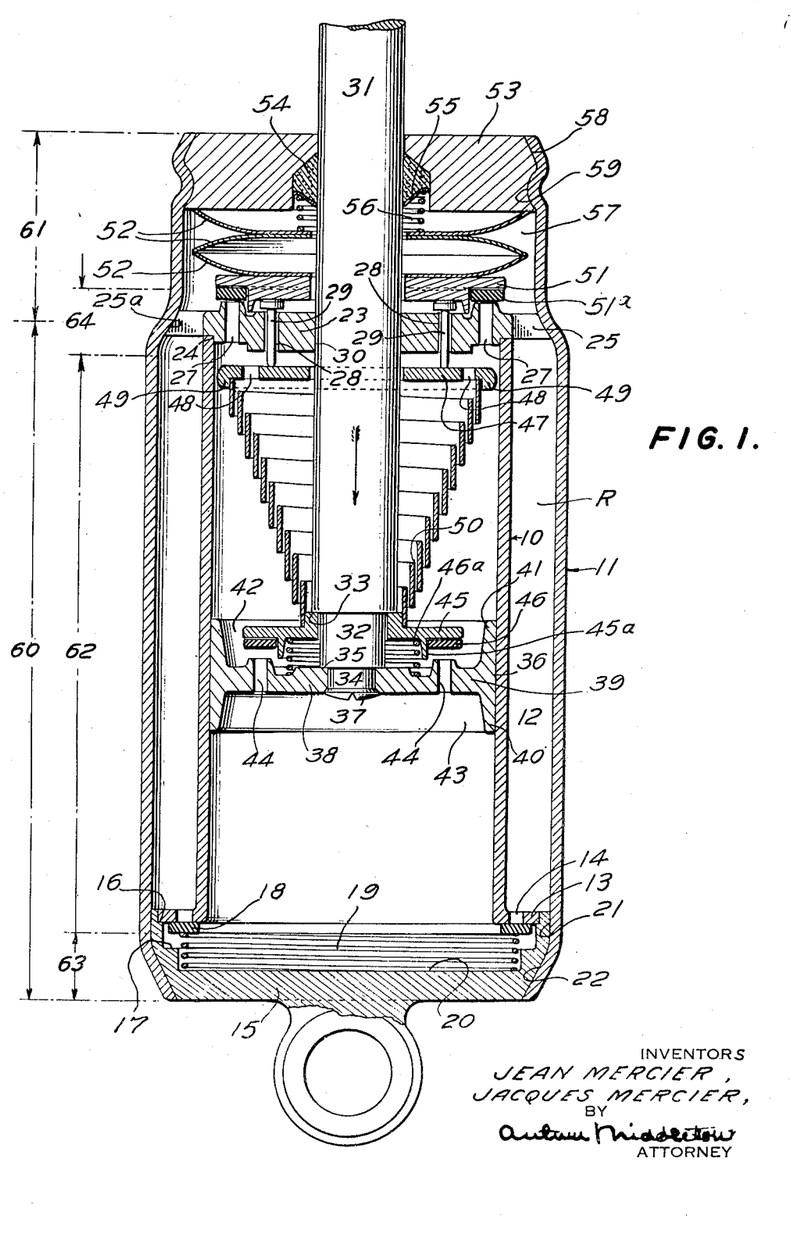
Fig. 1 is a longitudinal sectional view of the shock absorber showing the piston in its median or vertical position.
Figure 2:
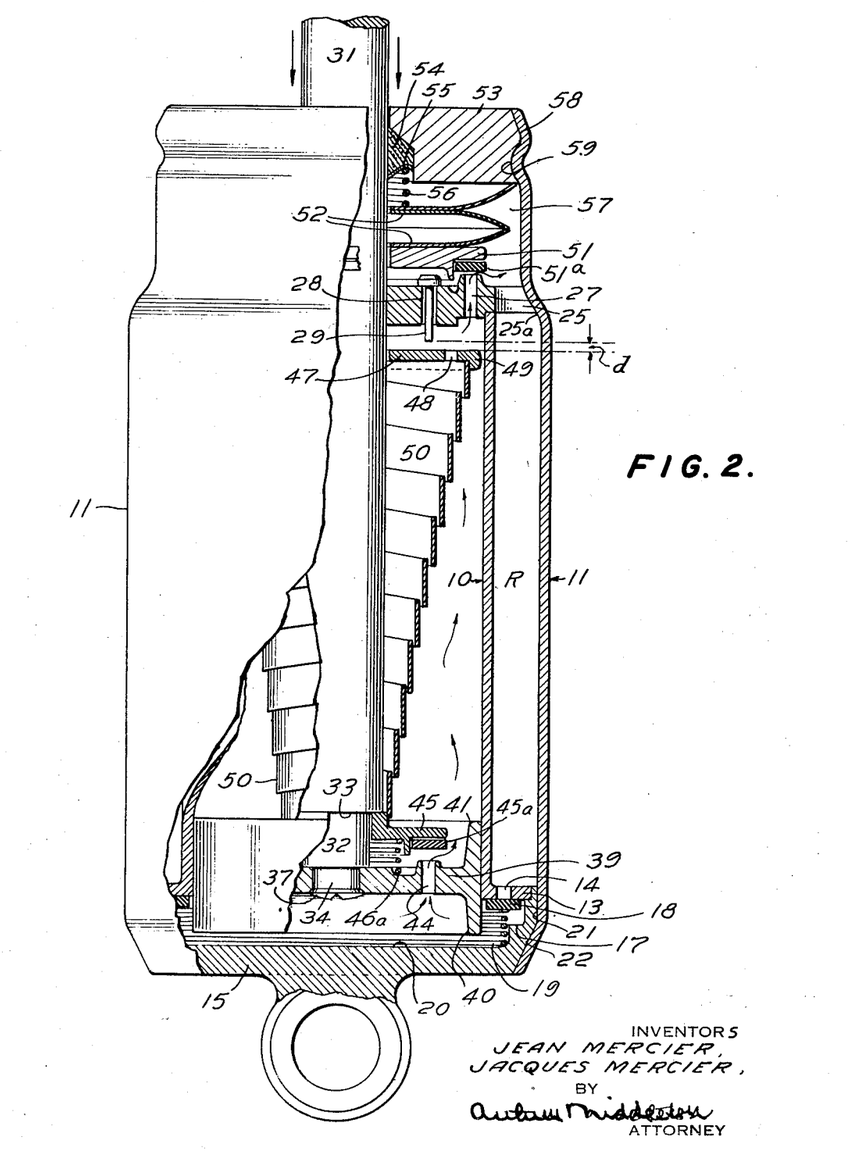
Fig. 2 is a similar, although part-sectional, view showing the piston close to its extreme retracted position.
Figure 3:
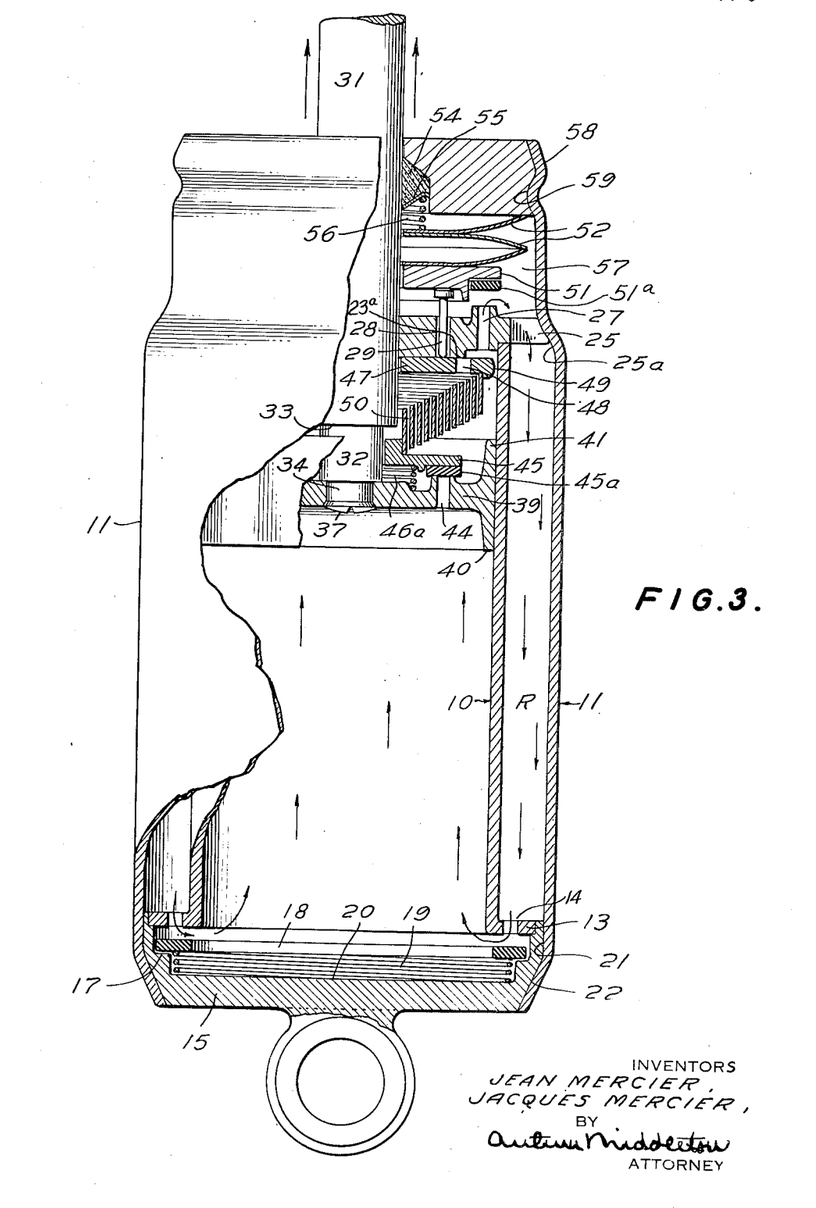
Fig. 3 is a similar, although part-sectional, view showing the piston near its extreme extended position.

The spirally coiled spring 50 is shown in semi-compressed condition in Fig. 1 and in fully expanded condition in Fig. 2 in which condition there exists a space or clearance "d" between the thrust plate 47 and the lower ends of the pressure-transmitting pins 29. In Fig. 3 the spring 50 is shown in a state of substantially full compression whereby accordingly it holds closed the check valve member 45 against the pressure of the coil spring 46a while keeping open the check valve member 51 by transmitting pressure through the thrust plate 47 and the pins 29 and overcoming the counter pressure of the Belleville washer spring 52. While in its expanded (Fig. 2) position the spring 50 allows the counter spring 46a to open the check valve member 45, while allowing the Belleville washer spring 52 to close the check valve member 51. The intermediate state of compression of spring 50 (see Fig. 1) is shown to be no longer capable of holding open the check valve member 51 against the Belleville washer spring 52, as well as to be reduced sufficiently to about permit the counter spring 46a to open the check valve member 45.

The coiled spring 50 is a variable-reaction spring, while the counteracting end springs, namely the coil spring 46a and the Belleville washer spring 52 are constant-reaction springs. The interplay forces between these three springs will appear from the following description of the operation.

*Operation*

Figure 4:
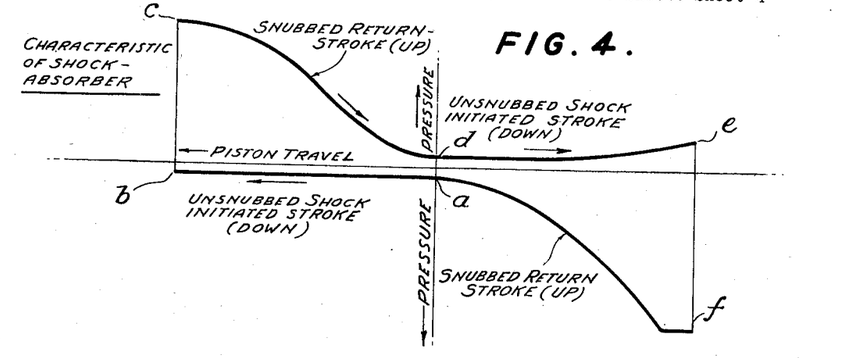
Fig. 4 is a diagram of the operation of the shock absorber per se, presented in cyclic fashion.

Referring to the Figs. 1 to 3 embodiment, when a shock is received by the vehicle wheel hitting a hump in the road the vehicle spring is compressed while accordingly the shock absorber piston and piston rod are retracted from their neutral Fig. 1-position to the Fig. 2-position, this shock-initiated retraction stroke being substantially un-snubbed or undampened, namely as according to the substantially horizontal line $a$—$b$ in the Fig. 4 shock absorber diagram. The shock absorber reacts in this manner for the reason that the coiled spring 50 in expanding relieves its pressure upon the valve member 45 while the inlet check valve 18 closes, as the coil spring 46a aids in raising the valve member 45 from its seat upon the transfer passages in the piston. This permits the fluid from below the piston to be displaced against only light pressure through the passages 44 into the space above the piston, while excess fluid volume which is due to the displacement caused by the retracting piston rod escapes through the outlet passages 27 although subject to some counter-pressure from the Belleville spring washers 52.

Figure 5:
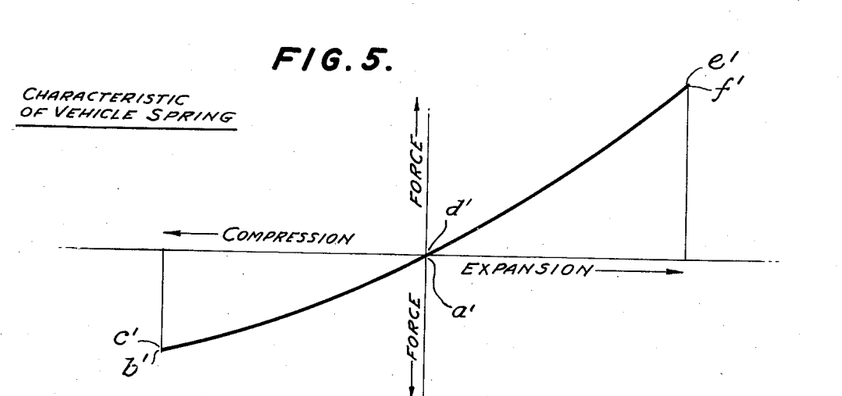
Fig. 5 is the pressure diagram of the springs to be dampened by the shock absorber.
Figure 6:
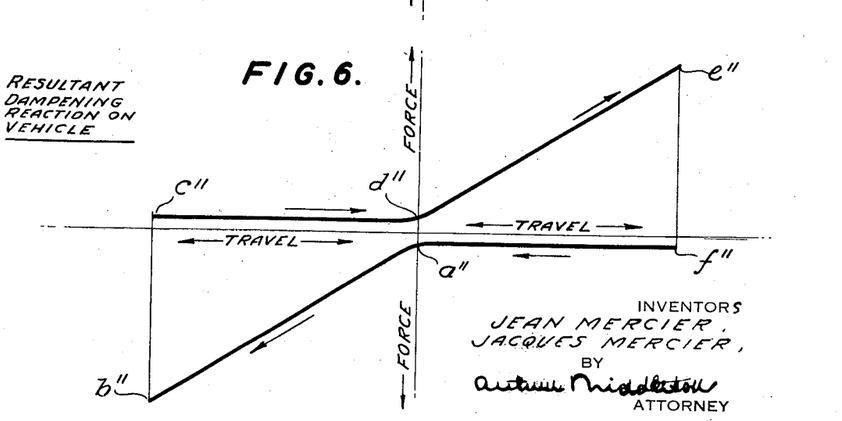
Fig. 6 is the dampening diagram resulting from a super-position of the Figs. 4 and 5 diagrams.

Fig. 2 thus illustrates a position of the piston still on its shock-initiated down stroke (retraction stroke) although near its extreme lower end position. Hence, during this phase the compression of the vehicle spring according to the line $a'$—$b'$ in the Fig. 5 diagram is unsnubbed so that a combination of the phase $a$—$b$ of the Fig. 4 diagram with the phase $a'$—$b'$ of the Fig. 5 diagram results in the phase $a''$—$b''$ of the Fig. 6 diagram representing the resultant reaction upon the vehicle body.

When the piston is in or near its lower dead center position the spring 50 is fully expanded, that is uncompressed and unconfined as will be seen from the clearance "d" between the thrust plate 47 and the pressure transmitting pins.

Then follows the snubbed return stroke of the piston from its extreme lower end position back to the intermediate or neutral Fig. 1-position, according to the phase represented by the line $c$—$d$ in the Fig. 4 diagram. The characteristics of this curve are such that initially there is a flat or shallow convex portion starting at point "c" which is followed by and merges into a steeper transitional portion which in turn merges into a shallower concave portion terminating at point "d." This dampens the rebound phase $c'$—$d'$ of the vehicle spring so that there results a snubbed phase $c''$—$d''$ in the form of a substantially horizontal line in the Fig. 6 diagram.

In terms of shock absorber operation this snubbing effect results due to reversal of piston travel from the extreme lowermost position of the piston, when the inlet check valve 18 opens to admit fluid from the reservoir into the space below the piston while the piston valve member closes because of such reversal and thereby imposes upon the piston such pressure or load as is necessary to expel fluid from the space above the piston through the outlet passages 27 and against the pressure of the Belleville washer spring 52 into the reservoir 12. The pressure reaction of spring 52 at this time, however, is partially neutralized by the then attained degree of compression of the spring 50. Thus the piston may be assumed to have left its neutral Fig. 1 position.

If now a shock in the opposite direction is received by the vehicle wheel, namely because of its passing over a depression in the road, the pressure upon the vehicle spring is thereby momentarily relieved and the spring allowed to expand due to the dropping of the wheel. This spring reaction as represented by the line $d'$—$e'$ in the Fig. 5 diagram is substantially unsnubbed or undampened as appears from the line $d$—$e$ in the shock absorber Fig. 4 diagram, as well as from the resultant reaction upon the vehicle body as represented by the line $d''$—$e''$ in the Fig. 6 diagram.

In terms of shock absorber operation this phase of the cycle is due to the further compression of the spring 50 (this being a variable-reaction spring in which the pressure reaction increases with increasing compression) whereby it overcomes the counter-pressure from the Belleville spring washers 52 permitting the fluid above the piston to escape through the passages 27 into the reservoir without meeting any substantial resistance. At the same time during this shock-initiated stroke the inlet check valve 18 opens to admit fluid from the reservoir into the space below the piston. Fig. 3 shows the piston still during its upward stroke although close to its upper end position, and the valve member 51 open because of the balancing force reaction from the now nearly fully compressed spring 50.

As a result of the compression of the spring 50 the thrust plate 49 is held against the top end portion 23 so that a shoulder 23ᵃ thereof partially blanks off the passage or hole 48 in the thrust plate.

Upon reversal of the travel of the piston from its upper end position the piston encounters a resistance and is snubbed on its return stroke to the neutral Fig. 1 position. That is to say, the rebound of the vehicle spring as represented by the line $f'$—$a'$ in the Fig. 5 diagram is snubbed by the shock-absorber resistance as represented by the line $f$—$a$ in the Fig. 4 diagram, the resultant reaction upon the vehicle body being represented by the line $f''$—$a''$ in the Fig. 6 diagram. It will be noted that during an operating cycle of the shock absorber such as represented by the closed or cyclic diagram in the Fig. 4, there takes place an interplay of forces between the spring 50 and the springs 52 and 46ᵃ, the spring 50 being a variable-reaction spring while the springs 52 and 46ᵃ are substantially constant-reaction springs.

The characteristics and the coaction of the springs determine the specific shape of the Fig. 4 shock absorber diagram from which it is noted that the outer end portions or initial portions of the snubbed return strokes $c$—$d$ and $f$—$a$ are substantially flattened whereby smooth shock-absorbing effects upon the vehicle body are attained. However, the characteristics of the shock absorber diagram can be modified by the substitution of a spring 50 having a different characteristic.

Figures 7, 8, 9:
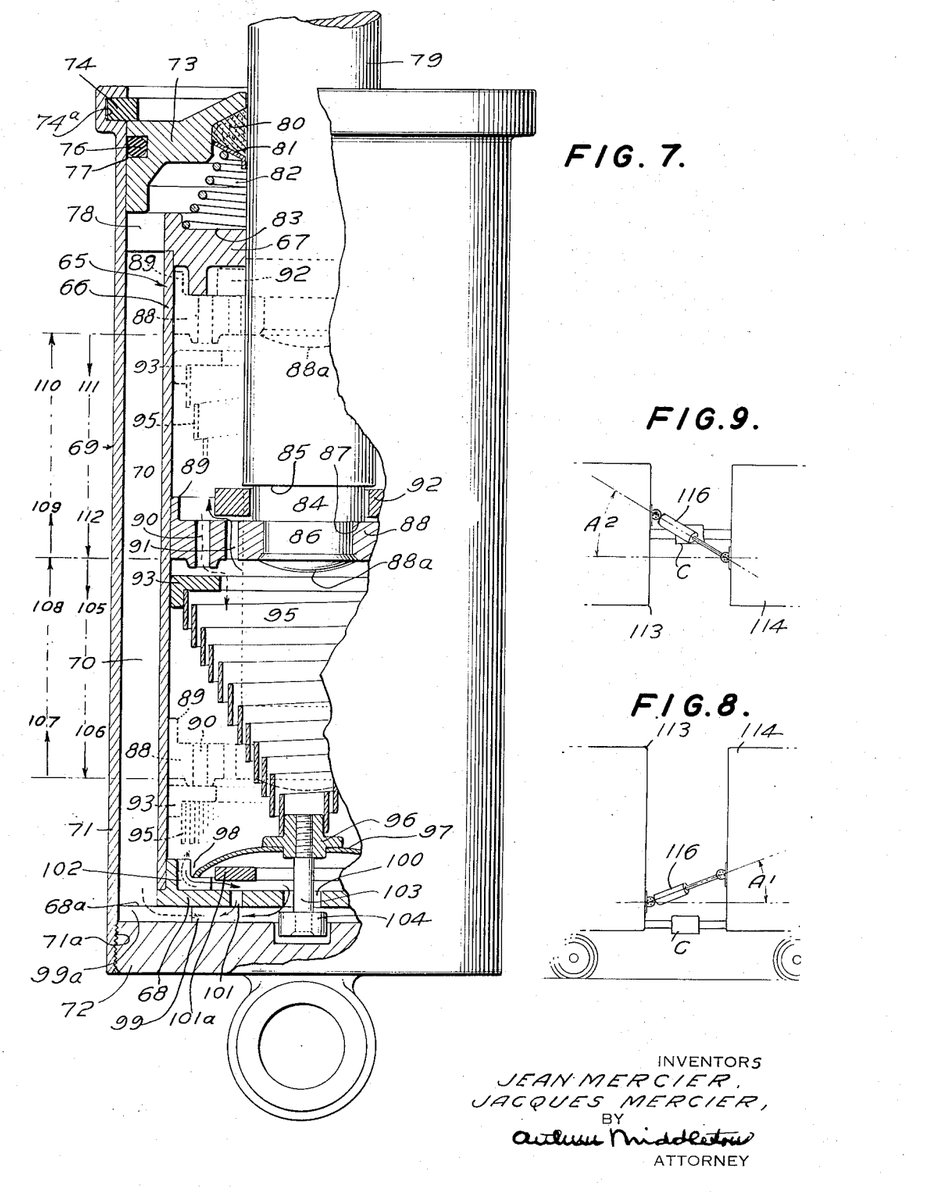
Fig. 7 is another embodiment of the invention.
Figs. 8 and 9 illustrate diagrammatically a specific manner of application of the shock absorber, namely as between coupled railroad cars.

In the Fig. 7 embodiment of the shock absorber a working cylinder 65 comprises a cylindrical body portion 66, a top closure piece 67, and a bottom closure piece 68. The working cylinder is surrounded by an outer housing cylinder or casing 69 forming with the working cylinder an annular reservoir 70, and comprising a cylindrical body portion 71, a bottom closure member 72 shown to be screwed into the cylindrical body portion 71 as at 71ᵃ and a top closure member 73 secured in the cylindrical body portion by a snap ring 74 sprung into an internal circular groove 74ᵃ formed at the upper end of the cylindrical body portion 71 and shown to be part thereof. The top closure member 73 has a sealing ring or so-called O-ring 76 extending in an annular external groove 77 for sealing the top closure member 73 against the surrounding cylindrical housing portion 71.

The working cylinder 65 is confined within the housing or casing 69 by being immovably confined between the top and the bottom closure members 73 and 72 thereof. That is to say the top closure piece 67 of the working cylinder has a marginal overhanging or flange portion 78 upon which engages the top closure member 73 of the housing, while the bottom closure piece 68 of the working cylinder has a marginal flange portion 68ᵃ engaged by the bottom closure member 72 of the housing. A piston rod 79 extends through the top end closure portions of the working cylinder as well as of the housing and is sealed by a gland represented by a sealing ring 80 held in place by a confining ring 81 held under pressure by a coil spring 82 which in turn is braced against the top closure piece 67 of the working cylinder, lodging in a shallow recess 83 thereof. The piston rod is formed at its lower end with a reduced portion 84 forming a shoulder 85, and also formed with a further reduced portion 86 forming a shoulder 87 upon which is seated a piston member 88 fixed in place by the riveted extreme end portion 88ᵃ of the piston rod. The piston member 88 has an upwardly extending skirt portion 89, and is provided with an outer set of flow transfer passages 90 for fluid transfer through the piston downwardly, and further provided with an inner set of flow transfer passages 91 for fluid transfer through the piston in the opposite direction, namely upwardly. Between the piston member 88 and the shoulder 85 there operates a movable annular unbiased check valve member 92 surrounding the reduced portion 84 and adapted to close the flow transfer passages 91.

The tension of the Belleville spring washer 97 is opposed to that of the spirally wound coil spring 95, the Belleville spring being a constant-reaction spring and substantially weaker than the spiral coil spring 95 which has a variable-reaction characteristic.

The flow passages 90 are adapted to be closed by an annular thrust plate 93 or annular valve member which may be of hard fiber or similar composition. The valve member 93 is under the influence of the wide end of a flat spirally coiled spring 95, the narrow end of the spring being braced against a thrust member 96 engaging a Belleville washer spring 97 which is marginally seated in a shallow recess 98 of the bottom closure piece 68 which is also provided with another shallow recess 99 at the underside as well as with a central outlet flow passage 100 for downward flow therethrough, flow passages 101 for upward flow therethrough past an annular unbiased check valve member 101ᵃ, and with recesses 102 to constitute 2-way flow passages. Radially from the recess 99 extend one-way flow passages 99ᵃ through which fluid may be drawn from the reservoir 70.

Rigidly connected with and downwardly from the thrust member 96 extends a valve stem 103 at the lower end of which is provided a valve member 104.

The function of the Fig. 7 shock absorber is similar to that of the Figs. 1 to 3 embodiment in regard to the stroke-pressure diagram involved.

Mechanically the operation is as follows:

When the piston is in its median or zero position (as shown in full lines) the spiral coil spring 95 is partially compressed exerting a corresponding pressure against Belleville washer spring 97 and thereby partially neutralizing the valve closing tendency thereof.

When a shock is received as by the car wheel hitting a hump on the road, the piston rod 79 is thereby retracted, moving the piston member 88 down from its median or zero position as indicated by arrow 105.

The spring 95 is further compressed overcoming the counter-pressure of Belleville washer spring 97 thereby fully opening the valve 104. Hence the piston moves downwardly on its shock-initiated stroke against relatively little hydraulic pressure resistance since excess pressure fluid can escape through outlet passage 100 while fluid from the underside of the piston is being displaced past the check valve 92 to the space above the piston.

The lowermost or bottom dead center position of the piston is indicated in the partial dot-and-dash line showing thereof as well as by the arrow 106, and by the condition of the spring 95 indicated to be fully compressed.

Upon reversal of the piston movement from the bottom dead center position in the direction of arrow 107, hydraulic resistance pressure is encountered since the check valve member 92 closes. That is to say the fluid from above the piston must be displaced through the transfer passages 90 against the valve closing pressure of the spring 95, until the piston reaches again its neutral or median position corresponding to arrow 108.

When a shock is received as by the car wheel hitting a depression in the road, the piston rod 79 is thereby extended moving the piston member 88 upwardly from is median position as indicated by arrow 109.

During this upward shock-initiated stroke the spring 95 expands further relieving the valve-closing pressure upon transfer flow passages 90, hence little hydraulic pressure resistance is encountered by the piston on this stroke until the piston reaches the top dead center position indicated by the partial dot-and-dash line showing thereof as well as by arrow 110.

When the piston reaches its upper dead center position, the transfer passages 90 become partially blanked off by the top closure piece 67 of the working cylinder.

Upon reversal of the piston from its top dead center position, as indicated by arrow 111, hydraulic pressure resistance is encountered by the piston on its return stroke for the reason that the valve member 93 closes while the check valve member 92 opens, but the outlet passage 100 is kept closed by the closing tendency of the Belleville spring washer 97, since the spring 95 is not yet compressed sufficiently to exert sufficient counter-pressure upon the Belleville spring washer to open the outlet valve member 104.

However as the compression of spring 95 increases, it will finally overcome the counter-pressure from the Belleville spring washer so as to open valve member 104 causing the hydraulic pressure resistance to drop as the piston again approaches its neutral or median position indicated by arrow 112.

With respect to the Fig. 7 embodiment of a shock absorber, we have found it to be advantageous to embody the following dimensional relationship between the inner diameter D of the working cylinder and the diameter "d" of the piston rod:

$$D \text{ approx. equal to } d\sqrt{2}$$
For example with $D = 1\tfrac{1}{8}''$
$d = .75''$ Figs. 8 and 9 show diagrammatically an application of the shock absorber for dampening the shocks or impacts between coupled freight cars, Fig. 8 being a side view, and Fig. 9 being a plan view of the mounting of the shock absorber as proposed by this invention.

Two freight cars 113 and 114 are interconnected by a coupling C as well as by a shock absorber 116 mounted in a novel manner in that its longitudinal or thrust axis extends at an angle $A_1$ relative to the horizontal plane, as well as at an angle $A_2$ relative to the longitudinal axis of the cars, that is at an angle relative to the path of their forward movement.

As a result of this mounting shocks between the cars are effectively absorbed not only when they occur in longitudinal direction, that is in the line of progress of the cars, but also when they occur transversely between the cars.

We claim:

1. Shock absorber apparatus having a liquid-holding reservoir, a container connected therewith adapted to resist liquid pressure and having a body portion with an inlet end portion and an outlet end portion, an inlet valve effective at the inlet end portion controlling liquid flow to the container from the reservoir, a loaded outlet valve effective at the outlet end portion controlling liquid flow from the container to the reservoir, a movable partition in the container reciprocable between the end portions, a fluid transfer valve carried by the movable partition for controlling liquid flow from one side to the other of the partition when the partition is in motion, and main resilient compressible means effective between said transfer valve and said outlet valve the length of which resilient means varies with the distance between said transfer valve and said outlet valve whereby when that distance diminishes the load on the resilient means increases thus increasing the load on the transfer valve while facilitating opening of the outlet valve and when that distance increases the load on the resilient means decreases thus decreasing the load on the transfer valve and increasing the load on the outlet valve, and motivating means for said partition.

2. Apparatus according to claim 1, wherein the load pressing the outlet valve comprises an apertured dished spring.

3. Apparatus according to claim 1, wherein the resilient means is a spirally coiled spring.

4. Apparatus according to claim 1, with the addition of compression counter resilient means for opening the transfer valve when the main resilient means are substantially decompressed.

5. Apparatus according to claim 1, with the addition of a reciprocable plate interposed between the outlet valve and the adjacent end of the resilient means and against which plate the resilient means bears, said plate being shaped to allow the flow of liquid therepast from the container through the outlet valve.

6. Apparatus according to claim 1, wherein at least one of the valves includes an annular plate of hard-fiber material.

7. A shock absorber having a liquid-holding reservoir, a cylindrical container connected with the reservoir, said container having a body portion and an inlet head portion at one end and an outlet head portion at the other end of the body portion, a piston reciprocable in said container between the head portions, an inlet check valve effective at and associated with the inlet head portion controlling liquid flow to the container from the reservoir, a loaded outlet check valve effective at and associated with the other head portion controlling liquid flow from the container to the reservoir, a fluid transfer check valve carried by the piston and controlling passage of liquid from one side to the other of the piston when the piston is in motion, and actuating means between the transfer valve and the outlet valve comprising reciprocable means extending through the outlet head portion and adapted to bear upon the outlet valve in opposition to the load thereon, a reciprocable plate within the container adapted to bear upon said reciprocable means, and a main compression spring between the plate and the transfer valve whereby as the distance between the outlet valve and the transfer valve diminishes the load on the spring increases thus increasing the load on the transfer valve while relieving through said reciprocable means the load upon the outlet valve thereby facilitating the opening thereof, and as that distance increases the load on the spring decreases thus decreasing the load on the transfer valve while increasing the load on the outlet valve.

8. Apparatus according to claim 7, wherein said reciprocable means comprises a reciprocable pin.

9. Apparatus according to claim 7, wherein the cylindrical container is surrounded by said reservoir, the outlet valve is disposed within the cross-sectional area defined by the interior of the cylindrical container, and the inlet valve is disposed within the annular cross-sectional area of the reservoir.

10. Apparatus according to claim 7, with the addition of a compression counter spring for opening the transfer valve when the main compression spring is substantially decompressed.

11. Apparatus according to claim 7, wherein the parts comprising the cylinder and the head portions thereof are held in operative relationship by a swaged-on enveloping casing that also forms one wall of the reservoir.

JACQUES H. MERCIER.
JEAN MERCIER.

REFERENCES CITED

The following references are of record in the file of this patent:

UNITED STATES PATENTS

| Number | Name | Date |
|---|---|---|
| 1,444,248 | Hoffmann | Feb. 6, 1923 |
| 1,592,912 | Thompson | July 20, 1926 |
| 1,840,178 | Transom | Jan. 5, 1932 |
| 1,992,526 | Funston | Feb. 26, 1935 |
| 2,107,974 | Bechereau et al. | Feb. 8, 1938 |
| 2,163,254 | Binder et al. | June 20, 1939 |
| 2,355,491 | Whisler | Aug. 8, 1944 |
| 2,379,750 | Rossman | July 3, 1945 |

FOREIGN PATENTS

| Number | Country | Date |
|---|---|---|
| 810,938 | France | Jan. 9, 1937 |